(No Model.) 2 Sheets—Sheet 1.
J. E. WYCKOFF.
HORSE HAY RAKE.
No. 526,886. Patented Oct. 2, 1894.
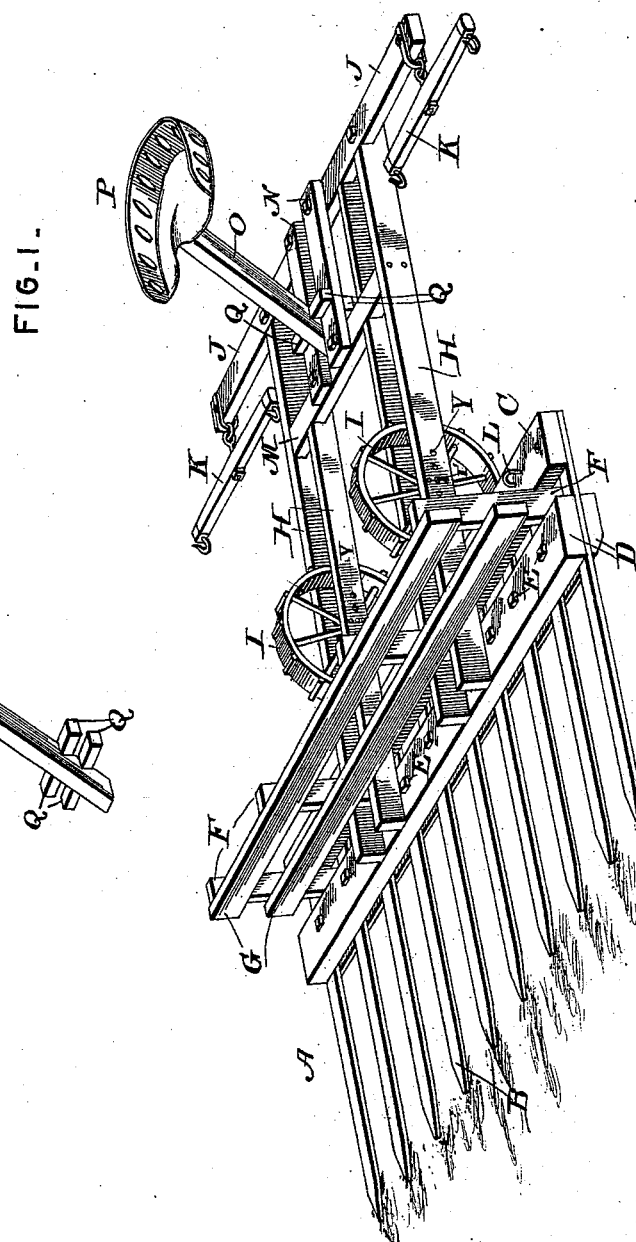
Witnesses
Jas. K. McCathran
[signature]
Inventor
J. E. Wyckoff
By his Attorneys.
C. A. Snow & Co.

(No Model.) 2 Sheets—Sheet 2.
J. E. WYCKOFF.
HORSE HAY RAKE.
No. 526,886. Patented Oct. 2, 1894.
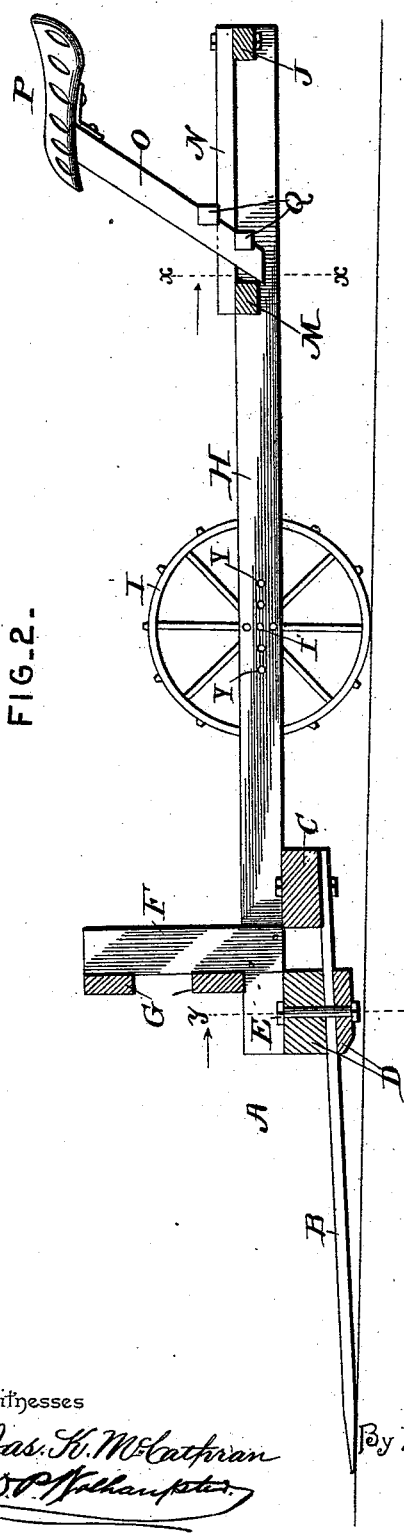
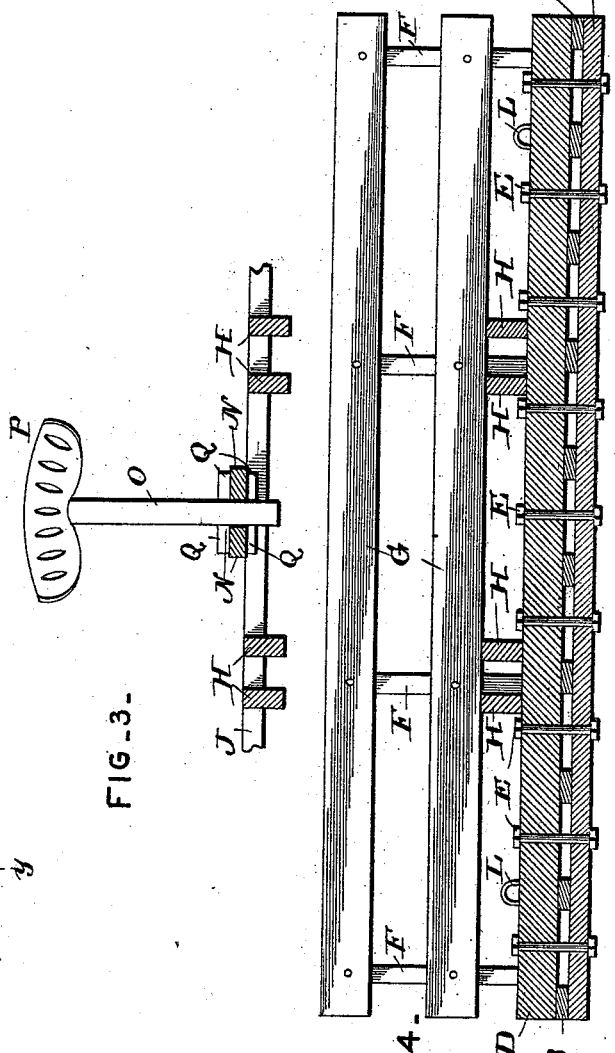
Witnesses
Jas. K. McCathran
D. P. Wolhaupter
Inventor
J. E. Wyckoff
By his Attorneys.
C. A. Snow & Co.

UNITED STATES PATENT OFFICE.

JOSEPH EDGAR WYCKOFF, OF RAND, COLORADO.

HORSE HAY-RAKE.

SPECIFICATION forming part of Letters Patent No. 526,886, dated October 2, 1894.

Application filed June 24, 1893. Serial No. 478,699. (No model.)

*To all whom it may concern:*

Be it known that I, JOSEPH EDGAR WYCKOFF, a citizen of the United States, residing at Rand, in the county of Larimer and State of Colorado, have invented a new and useful Horse Hay-Rake, of which the following is a specification.

This invention relates to horse hay rakes, and it has for its object to provide certain improvements in rakes of this character whereby the same shall be rendered better available for use upon all characters of ground and particularly on irrigated meadows.

To this end the main and primary object of the present invention is to provide a simple, strong and efficient rake which dispenses with the rods, lifting levers and other controlling devices usually employed in rakes of this character, and thereby providing a rake easily controlled, while still possessing all the necessary qualities for raking up and unloading the hay.

With these and other objects in view which will ready appear as the nature of the invention is better understood, the same consists in the novel construction, combination and arrangement of parts hereinafter more fully described, illustrated and claimed.

In the accompanying drawings, Figure 1 is a perspective view of a horse hay-rake constructed in accordance with this invention. Fig. 2 is a central vertical longitudinal sectional view. Fig. 3 is a detail transverse sectional view on the line x—x of Fig. 2. Fig. 4 is a similar view on the line y—y of Fig. 2. Fig. 5 is a detail in perspective of the seat and its shifting arm.

Referring to the accompanying drawings: A represents the rake having the ordinary rake teeth B, fixedly secured at their inner ends to the transverse rake head or bar C, immediately in front of which is arranged the parallel head clamp bars D.

The parallel head clamp bars D, form the main head of the rake A, and are clamped onto the teeth B, by means of the clamping bolts E, passing through both of the clamp bars and intermediate of the regularly spaced teeth B, thus providing means for clamping the rake to its proper adjusted position, and preventing the same from slipping, while at the same time permitting a length adjustment of the rake. It will be obvious, that by loosening the clamping bolts E and therefore relieving the rake teeth of the clamp bars, the said rake teeth can be slid in and out of the clamp formed by the bars D, by grasping the head C, and pulling or pushing the same, whereby the length of the rake teeth beyond the main clamp head can be adjusted as the necessity of the work may demand, on account of irregularity or unevenness of the ground on which the rake is employed.

Arising from the uppermost of the head clamp bars D, are the fender uprights F, to which are secured the transverse parallel fender bars G, which complete the head portion of the rake at the rear extremities of the teeth thereof and prevent the hay from falling off of the rake at such end.

Securely fastened at their front ends to the upper clamp bar so as not to interfere with the length adjustment of the rake, are the separate pairs of parallel rearwardly extended truck bars H. The parallel truck bars H, are extended in rear of the rake head sufficiently far, in order to secure the proper leverage for lifting the rake off the ground by the weight of the driver, and journaled between the bars of each pair of said truck bars are the traveling wheels I, which are disposed sufficiently near the head of the rake to permit the same to be readily overbalanced, when loaded and unloaded, by the weight of the driver, whereby the same can be readily transported over the ground.

The extreme rear extremities of the truck bars H, are connected by the transverse draft bar J, the ends of which are extended laterally beyond the opposite pairs of truck bars, and has attached to such ends the single-trees K, to which are hitched the draft animals, which walk between such draft bars and the head of the rake, and the breast straps of the harness are adapted to be attached to the attaching eyes L, on the rake head or bar C, thereby providing means which allow the draft animals to easily back the rake from under the load.

A supporting cross bar M, connects the separate pairs of truck bars H, directly in front of the draft bar J, and has attached to the same, intermediate of its ends, one end of the parallel slide supporting bars N, the other rear ends of which are secured to the draft bar J. The parallel slide supporting bars N, form a slot there-between and are adapted to support therebetween for adjustment the shifting seat arm O. The shifting seat arm O, carries on its upper outer end an ordinary driver's seat P, and is provided, at opposite sides near its lower end, with the squared spaced combined supporting and clutch pins Q, which pins are adapted to engage on top of and under each of the slide bars N. The lower end of the seat arm, which carries the squared pins Q, works in the slot formed between the slide supporting bars N, and when no weight is on the seat arm by reason of a person sitting in a driver's seat, the said seat arm can be readily adjusted by sliding back and forth between the bars N, in order to accommodate the driver's weight to the rake, but, when the driver sits in the seat, the corners of the squared pins Q clutch or bind on the slide bars, and firmly hold the seat arm and the seat steady, and effectually prevent the same from slipping out of position.

Now from the foregoing it is thought that the construction, operation and advantages of the herein-described horse hay rake will be readily apparent to those skilled in the art. When transporting the rake over the ground from place to place, the driver mounts his seat and thereby lifts the rake off of the ground and out of an operative position, and by reason of the adjustment of the seat, this result is secured whether the rake is loaded or not, but when loading, the driver dismounts from the seat and allows the rake teeth to drop onto the ground, and the same are held onto the ground, in raking up the hay, on account of the direct draft of the animals on the rear draft bar J. At this point it may be well to observe that the parallel truck bars H, of the rake are provided at a point intermediate of their ends with a longitudinal and vertical series of bearing openings Y, any of which are adapted to receive the journal pins I', of the traveling truck wheels I. By reason of this adjustment the said truck wheels can be readily moved in either direction lengthwise of the truck bars in order to equalize the weight of the rake to secure a proper balance, and the said truck wheels can by this means be also raised or lowered to secure the proper angle of the rake teeth to the ground. The adjustments are made by simply removing the journal pins and changing the same to different holes or bearing openings Y, in the truck bars.

Changes in the form, proportion and the minor details of construction may be resorted to without departing from the principle or sacrificing any of the advantages of this invention.

Having thus described the invention, what is claimed, and desired to be secured by Letters Patent, is—

1. In a horse hay rake, a wheeled frame, a driver's seat mounted for longitudinal adjustment on one end of the frame, and a longitudinally adjustable rake clamped on the opposite end of the frame, substantially as set forth.

2. In a horse hay rake, a wheeled frame carrying an adjustable seat at one end, and having a head clamp at its other end, and a ground rake clamped for adjustment by said head clamp, substantially as set forth.

3. In a horse hay rake, the combination with the ground rake; of parallel head clamp bars clamped onto the teeth of the rake in front of the rake head and providing for the length adjustment of the rake, a rake fender frame secured to the uppermost clamp bar, rearwardly extended truck frame bars attached at their front ends to the upper clamp bar and carrying wheels adjacent to the rake head, and a longitudinally adjustable seat supported between the truck frame bars at their rear ends, substantially as set forth.

In testimony that I claim the foregoing as my own I have hereto affixed my signature in the presence of two witnesses.

JOSEPH EDGAR WYCKOFF.

Witnesses:
C. E. MOSMAN,
W. R. MONAHAN.